United States Patent [19]

Galli

[11] Patent Number: 4,683,695
[45] Date of Patent: Aug. 4, 1987

[54] CHANNELLED BASE MEMBER FOR DIVIDER PANELS

[75] Inventor: Massimo Galli, Massa, Italy

[73] Assignee: Olivetti Synthesis, S.p.A., Ivrea, Italy

[21] Appl. No.: 902,587

[22] Filed: Sep. 2, 1986

[30] Foreign Application Priority Data

Sep. 18, 1985 [IT] Italy .................. 67790 A/85

[51] Int. Cl.$^4$ .......................... E04F 19/04; E04B 2/74
[52] U.S. Cl. .......................................... 52/221; 52/242
[58] Field of Search ................. 52/220, 241, 242, 239

[56] References Cited

U.S. PATENT DOCUMENTS

| | | | |
|---|---|---|---|
| 3,708,607 | 1/1973 | Brode | 52/221 |
| 4,133,153 | 1/1979 | Hage | 52/220 |
| 4,248,018 | 2/1981 | Casamayor | 52/202 |
| 4,407,101 | 10/1983 | Propst | 52/242 |
| 4,470,232 | 9/1984 | Condevaux | 52/242 |
| 4,596,098 | 6/1986 | Finkbeiner | 52/241 |
| 4,599,836 | 7/1986 | Melcher | 52/202 |

FOREIGN PATENT DOCUMENTS 2459017 6/1976 Fed. Rep. of Germany ........ 52/202

Primary Examiner—John E. Murtagh
Attorney, Agent, or Firm—Banner, Birch, McKie & Beckett

[57] ABSTRACT

The base member for divider panels comprises a load-bearing support which defines two supply passages or channels for electrical cables and houses power outlets for supplying items of electrical equipment which are adjacent to the panels. The support is integral with two cover plate portions which complete the two passages and are movable from an open position in which they permit access to the passages to a closed position in which they completely cover the two passages. The base member is of plastics material produced by extrusion in one piece and comprises rigid zones capable of operating as a support means and flexible, hinge zones capable of permitting movement of the plate portions. Resilient lips extending along the two plate portions engage with latch means on the load-bearing support to hold the plate portions in the closed position.

6 Claims, 5 Drawing Figures

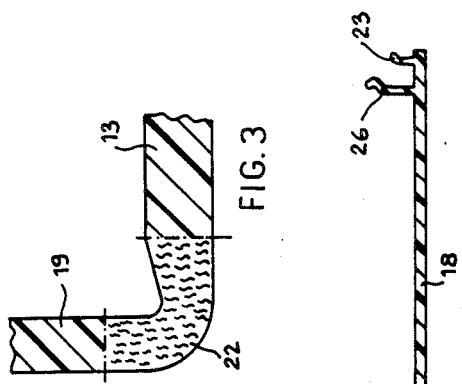
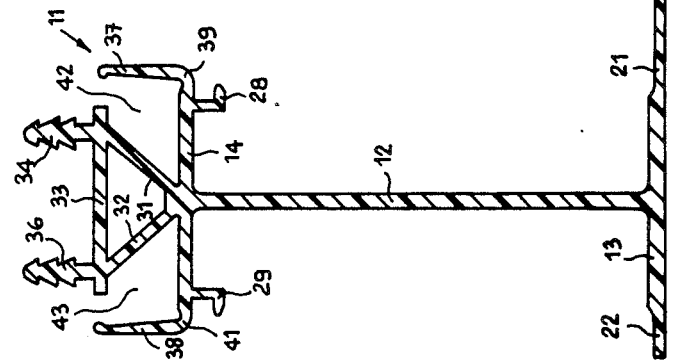
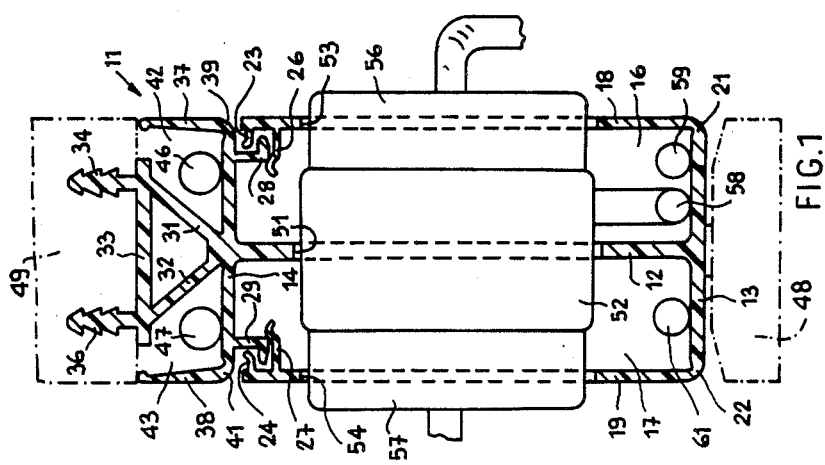

CHANNELLED BASE MEMBER FOR DIVIDER PANELS

BACKGROUND OF THE INVENTION

The present invention relates to a channelled base member for divider panels, in which a load-bearing support defines a supply passage or channel for electrical cables for supplying items of electrical equipment which are disposed adjacent to the divider panels.

A channelled base member is known, having a supply channel or passage for electrical cables which is closed at the front by a cover portion fixed to the base member either by means of screws or by means of resilient connecting means. That makes the base member rather expensive and gives rise to the risk of the cover portion being lost.

SUMMARY OF THE INVENTION

The object of the present invention is to provide a channelled base member which is simple and reliable and which improves and facilitates assembly and is also of low cost.

The base member according to the invention is characterised in the manner set forth in claim 1.

BRIEF DESCRIPTION OF THE DRAWING

A preferred embodiment of the invention is set forth in the following description which is given by way of non-limiting example with reference to the accompanying drawing in which:

FIG. 1 is a view in section of part of the channelled base member according to the invention, FIG. 2 is a view in section of part of the channelled base member shown in FIG. 1, in an operating position, FIG. 3 is a view in section on an enlarged scale of a detail from FIG. 1.

DESCRIPTION OF THE PREFERRED EMBODIMENT

Figure 4:
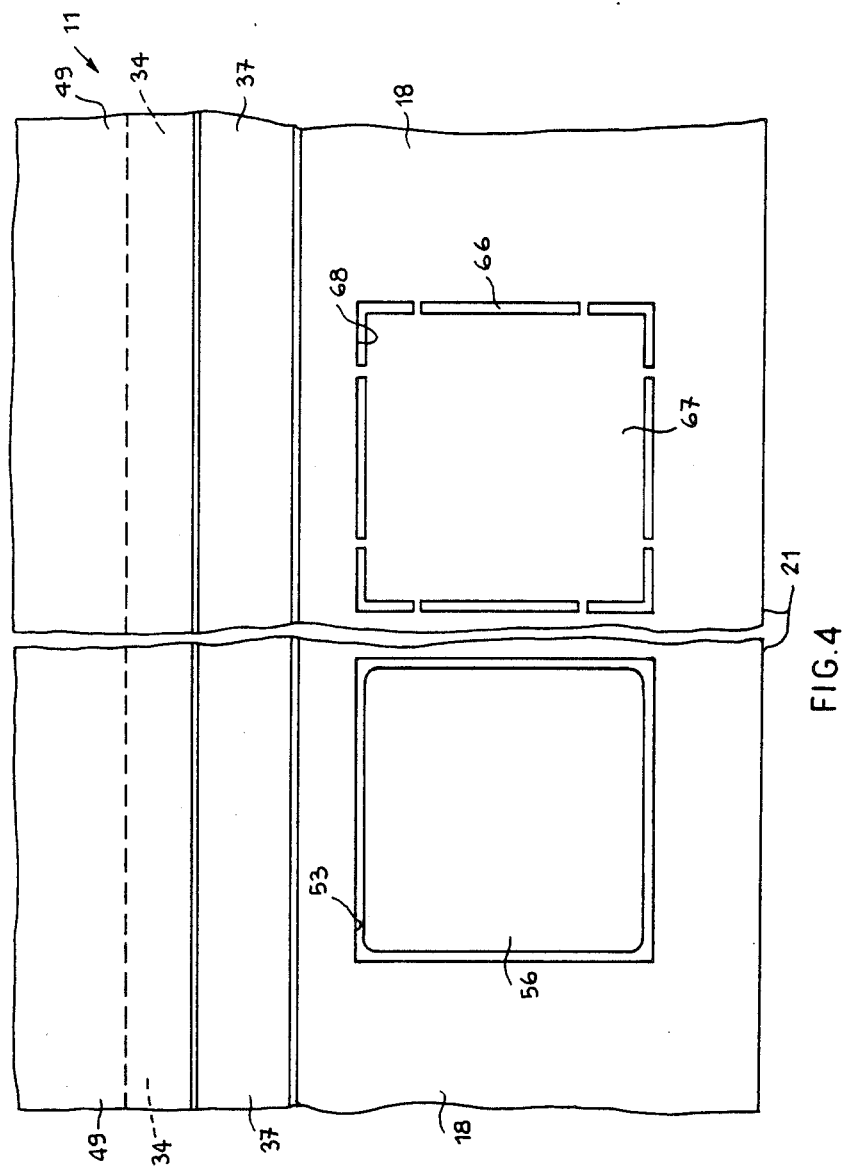
FIG. 4 is a front view of part of the base member shown in FIG. 1.

Referring to FIG. 1, the channelled base member is indicated generally by reference numeral 11 and comprises a load-bearing support 12 formed by a substantially vertical wall portion having a base 13 and an upper wall portion 14 which is horizontal and parallel to the base 13, both being perpendicular to the load-bearing support 12, thus forming a double T-shaped configuration. The base 13, the wall portion 14 and the load-bearing support 12 define two supply passages or channels 16 and 17 which are respectively closed by two covers 18 and 19 which are formed by two wall portions which are vertical and substantially parallel to the load-bearing support 12, in their closed position. Each cover 18 and 19 is connected to the base 13 by means of a hinge indicated at 21 and 22 respectively. Each cover 18 and 19 is provided on its free end, remote from the respective hinges 21 and 22, with a closure strip portion 23,24 and a resilient strip portion 26, 27 disposed at a lower level than the closure strip portion 23 and 24. Each resilient strip portion 26 and 27 cooperates with a respective latching strip portion 28 and 29 projecting from the horizontal wall portion 14 to hold the respective cover 18 and 19 in a closed position, parallel to the load-bearing support 12, as shown in FIG. 1.

Two ribs 31 and 32 which branch away from each other are arranged to project from the upper wall portion 14, opposite to the load-bearing support 12. The ribs 31 and 32 terminate with a horizontal wall portion 33 which is parallel to the upper wall portion 14. Two strip portions 34 and 36 bearing sawtooth configurations project upwardly opposite to the ribs 31 and 32 and adjacent to the free ends of the horizontal wall portion 33.

Two side strip portions 37 and 38 which are in the same plane as the covers 18 and 19 are connected by respective hinges 39 and 41 to the ends of the upper wall portion 14. The side strip portions 37 and 38, with the upper wall portion 14 and the ribs 31 and 32, define two upper supply channels or passages 42 and 43.

The channelled base member 11 is of plastics material, for example PVC, and is produced by means of extrusion in known fashion in one piece. Therefore, all the portions described hereinbefore are integral with each other. During the extrusion operation, using known methods, zones of yielding and flexible material and zones of hard and rigid material are defined. The yielding zones comprise the hinges 21, 22, 39 and 41 and the side strip portions 37 and 38. FIG. 3 is a view in section of the hinge 22 on an enlarged scale in order better to distinguish the yielding zone from the hard zone. The hard zones are all the remaining portions. The base member 11 which is produced in channel-defining form by extrusion is of the configuration shown in FIG. 2 and is of an unlimited length and can thus be cut according to the requirements involved and at variable lengths, for example 600 mm, 1200 mm, 1500 mm, and so on.

The yielding zones which define the hinges 21 and 22 (see FIG. 1) provide the flexibility necessary for bending of the covers 18 and 19 for engagement of the resilient strip portions 26 and 27 with the latching strip portions 28 and 29. The yielding zones 37, 38, 39 and 41 in turn permit easy bending of those portions for access for example to cables 46 and 47 in the upper supply passages 42 and 43.

Besides performing a support function, the hard zones permit fixing in known manner, for example by means of screws, of the usual support foot members 48 to the base 13 and a divider panel 49 to the wall portion 33 and to the toothed strip portions 34 and 36. When the two covers 18 and 19 are in their closed position, the rigid portions thereof increase the overall rigidity and strength of the entire base member.

Other working operations may also be carried out in a location for working operation on the assembly and for mounting the foot members 48 and the divider panels 49, such as for example: the provision of mountings or openings 51 which are provided in the load-bearing support 12 for mounting multiple power outlets 52. The covers 18 and 19 are in turn provided with two housings or seat means 53 and 54 respectively to permit the connection of electrical plugs 56 and 57 to the outlets 52.

FIG. 1 shows one form of assembly in order more clearly to show the concept of use of the channelled base member 11. That form is in no way limiting in respect of the scope of the invention. Besides the multiple outlet 52 and the electrical plugs 56 and 57, also housed in the channel 16 is a cable 58 for the supply of power to the outlet 52 and a second cable 59 for other uses. Housed in the passage 17 is a cable 61 while the cables 46 and 47 are housed in the respective upper supply passages 42 and 43. The cables 46 and 47 may be used for connecting telephones or audiovisual apparatuses or other user devices which are separate from the power cables 58, and the same may be said in respect of the cables 59 and 61.

As already described hereinbefore, the working operations in respect of the hard zones for providing seat means, housings, holes, openings and so forth may be carried out in the factory during construction of the panels or they may also be easily performed at the location at which the divider panels 49 are to be set up, by means of cutting or milling tools, drills and other portable tools.

In the embodiment shown in FIG. 4 which is a front view of part of the cover 18, it will be seen that there is the seat or opening 53 for the plug 56 and for example a prefabricated portion having slots 66 into which the operator inserts a screwdriver to break off the portion 67 and thus produce an opening 68.

Figure 5:
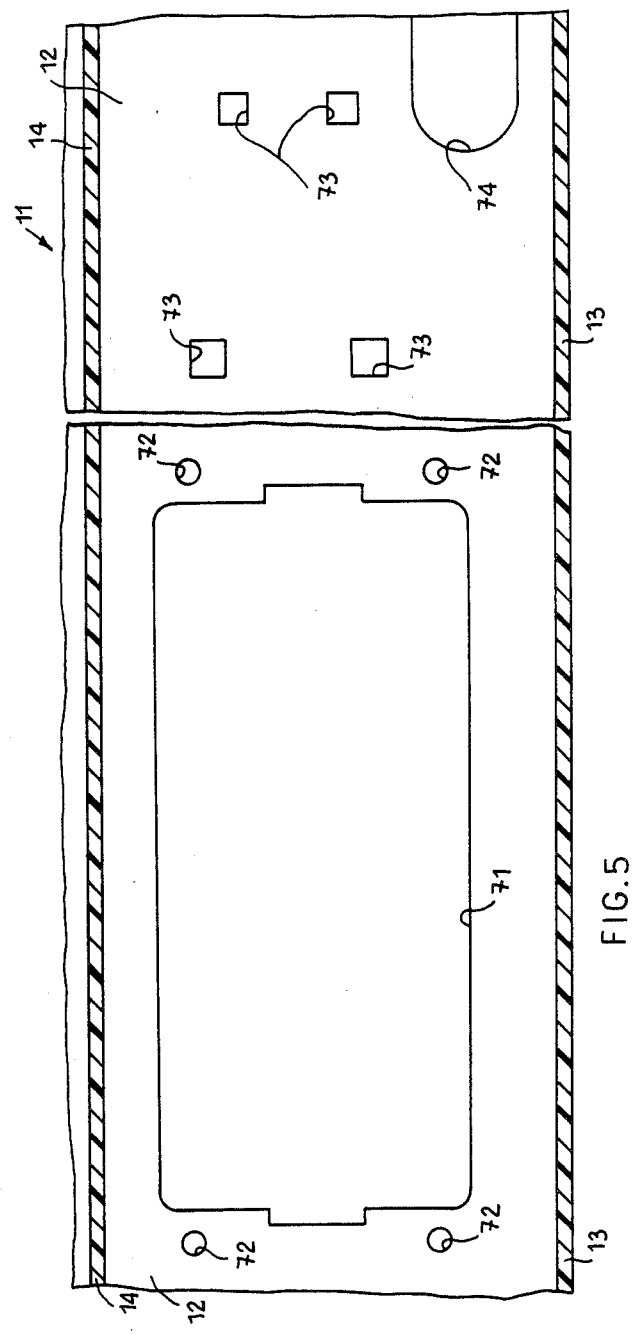
FIG. 5 is a front view in section of part of the base member shown in FIG. 1.

It will be seen from the construction shown in FIG. 5 that the load-bearing support 12 may have seat means or openings 71, holes 72 and 73 and slots 74 for any use such as for example for accommodating multiple or single outlets, cables etc.

After the base member 11 (FIG. 1) has been cut to size, the operator mounts the various outlets 52 on the support 12, positions the various cables 46, 47, 58, 59 and 61 in the passages 16, 17, 42 and 43 and then rotates the covers 18 and 19 about the hinges 21 and 22 until the resilient strip portions 26 and 27 are engaged with the respective latching strip portions 28 and 29.

For handling or other operations, the operator uses a screwdriver to apply a slight pressure between the closure strip portion 23 and 24 and the external edge of the hinge 39 or 41 until the resilient strip portion 26 or 27 is disengaged from the respective latching strip portion 28 or 29. The operator then rotates the cover 18 and 19 about the hinge 21 or 22 until it takes up the position shown in FIG. 2. The operator can now gain access to the outlets 52 (see FIG. 1) and to the cables 58, 59, and 61. When his handling operations have been carried out, the operator acts as described above, rotating the cover 18, 19 until the resilient strip portion 26 or 27 is engaged with the respective latching strip portion 28 and 29, and finally he re-fits the plugs 56 and 57.

The channelled base member 11 as described hereinbefore is strong, compact, functional and simple and permits substantial speed of mounting for supplying items of electrical equipment disposed adjacent to the divider panels 49.

It will be appreciated that the channelled base member 11 for divider panels 49 may be the subject of various modifications and improvements both in respect of the shape and the arrangement of the various parts without thereby departing from the scope of the invention.

What I claim is:

1. A channelled base member for divider pannels comprising a load-bearing support provided with a supply passage for electrical cables for supplying items of electrical equipment which are disposed adjacent to the divider panels, wherein the load-bearing support is integral with at least one cover element which completes the supply passage and is movable from a first position in which the cover causes access to the passage to a second position in which the cover completely covers the passage, and wherein the base member is of plastics material produced in one piece and comprises a first substantially rigid portion for performing a support function and a second flexible portion defining a hinge for causing the cover element to take up the first and second positions, further comprising,
   a second supply passage defined by the load-bearing support and disposed on the opposite side with respect to the first passage;
   a second cover element which is substantially identical to the first cover element integral with the support through another hinge and movable between first and second positions respectively for access to and for closing of the second passage; and
   resilient means on the cover element which cooperate with latch means on the load-bearing support when the cover element is in the second position;
   wherein the load-bearing support is of a cross section of substantially a double T-shaped configuration comprising, in use, a substantially vertical wall portion and two horizontal flanges in which a first flange has a support function and is connected to the one and the other hinge for the first and the second cover elements;
   wherein the second flange comprises latching means for the two cover elements and two further hinges connected to two side strip portions which are in the same plane as the first and second cover elements when these elements are in their second positions; and
   wherein said second flange is integral with two ribs disposed in an inclined position and having a horizontal portion from which project strip portions bearing sawtooth configurations, which are capable of supporting a divider panel.

2. A base member according to claim 1, wherein the second flange, the ribs and the side strip portions define two further supply passages.

3. A base member according to claim 2, wherein the other two hinges and the two side strip portions are formed by yielding flexible zones to permit access to the said other two supply passages.

4. A channelled base member for divider panels comprising a load-bearing support formed by a substantially vertical wall portion having a base and an upper wall portion, which is horizontal and parallel to the base; the base and the upper wall being perpendicular to the load-bearing support and forming a double T-shaped configuration; the base comprises at its ends two hinges and two covers connected therebetween; each cover comprises on its free end a closure strip portion and a resilient strip portion disposed at a lower level than the closure strip portion; the upper wall portion comprises at its ends two latching strip portions, which cooperate with the resilient strip portions when the two covers are in a closed position, parallel to the load-bearing support; wherein the load-bearing support, the base, the upper wall portion, the two hinges, the two covers, the closure strip portions, the resilient strip portions and the two latching strip portions are integral therebetween and are of plastics material; wherein the two covers are movable from an open position, in which they permit access to the passage, to the closed position, in which they completely cover the passage, and wherein when the two covers are in the closed position with the load-beaaring support, the base and the upper wall portion define two supply passages for cables.

5. A channelled base member according to claim 4, wherein the load-bearing support comprises coupling zones capable of carrying power outlets which can be connected to the cables of said passage.

6. A channelled base member according to claim 4, wherein the upper wall portion comprises on its free ends two hinges and two side strip portions connected therebetween and two ribs, which branch away from each other and project from the upper wall portion opposite to the load-bearing support, the two ribs terminate with a horizontal wall portion, which is parallel to the upper wall portion, wherein the side strip portions with the upper wall portion and the two ribs define two upper supply passages for cables, and wherein the upper wall portion, the two hinges, the two side strip portions and the two ribs are integral therebetween and are of plastics material.

* * * * *